US010577012B2

(12) United States Patent
Dekker et al.

(10) Patent No.: US 10,577,012 B2
(45) Date of Patent: Mar. 3, 2020

(54) STEERING WHEEL ASSEMBLY

(71) Applicant: Ford Global Technologies, LLC, Dearborn, MI (US)

(72) Inventors: Jasper Dekker, London (GB); Markus Quarta, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 15/581,917

(22) Filed: Apr. 28, 2017

(65) Prior Publication Data

US 2017/0341678 A1 Nov. 30, 2017

(30) Foreign Application Priority Data

May 25, 2016 (GB) .................................. 1609233.0

(51) Int. Cl.
*B62D 5/00* (2006.01)
*B62D 1/22* (2006.01)
(Continued)

(52) U.S. Cl.
CPC .............. *B62D 5/001* (2013.01); *B62D 1/04* (2013.01); *B62D 1/18* (2013.01); *B62D 1/22* (2013.01)

(58) Field of Classification Search
CPC . B62D 5/001; B62D 1/04; B62D 1/18; B62D 1/06; B62D 1/02; B62D 1/183;
(Continued)

(56) References Cited

U.S. PATENT DOCUMENTS 4,537,089 A * 8/1985 Moneta .................... B62D 1/18
280/775
4,778,133 A * 10/1988 Sakurai ................... B64C 13/04
244/220
(Continued)

FOREIGN PATENT DOCUMENTS

CN 103434560 A 12/2016
DE 2919284 A1 11/1980
(Continued)

OTHER PUBLICATIONS

Define on—Google Search, google.com., Dec. 16, 2018 (Year: 2018).*

(Continued)

*Primary Examiner* — Vinh Luong
(74) *Attorney, Agent, or Firm* — David Coppiellie; King & Schickli, PLLC

(57) ABSTRACT

A steering wheel assembly includes a steer-by-wire steering wheel and a central axis about which the steering wheel rotates to control the direction of travel of a motor vehicle. The steering wheel assembly also includes (a) a support arm, the steering wheel being coupled to a first end of the support arm so as to permit rotation of the steering wheel about the central axis of the steering wheel and (b) an interior trim portion, wherein the second end of the support arm is slidably coupled to a track of the interior trim portion. The track is configured such that the steering wheel is movable relative to the interior trim portion from a first deployed position in which a first occupant of the vehicle steers the steering wheel to a position away from the first deployed position.

18 Claims, 6 Drawing Sheets

(51) Int. Cl.
*B62D 1/04* (2006.01)
*B62D 1/18* (2006.01)

(58) Field of Classification Search
CPC ........ B62D 1/181; B60K 28/02; B60K 37/00; B60K 2370/685; A61B 5/18; B32B 17/064; G06G 9/00; G06K 28/063; B60T 2260/02; B60T 2270/82
See application file for complete search history.

(56) References Cited

U.S. PATENT DOCUMENTS

| | | | |
|---|---|---|---|
| 7,862,084 B2 * | 1/2011 | Maeda | B60K 37/00 180/402 |
| 2002/0089160 A1 * | 7/2002 | Mendis | B62D 1/181 280/777 |
| 2004/0016588 A1 | 1/2004 | Vitale et al. | |
| 2005/0283288 A1 | 12/2005 | Howell et al. | |
| 2010/0175499 A1 | 7/2010 | Thomas | |
| 2017/0313341 A1 * | 11/2017 | Hoggarth | B62D 1/06 |
| 2018/0052541 A1 * | 2/2018 | Hoggarth | G06T 7/70 |
| 2018/0154925 A1 * | 6/2018 | Steinkogler | B62D 5/001 |
| 2019/0016365 A1 * | 1/2019 | Swamidason | B62D 1/183 |
| 2019/0152505 A1 * | 5/2019 | Hansen | B62D 1/183 |

FOREIGN PATENT DOCUMENTS

| | | |
|---|---|---|
| DE | 4409046 A1 | 9/1995 |
| DE | 10259684 A1 | 7/2004 |
| EP | 0802105 A2 * | 10/1997 |
| EP | 1686039 A1 | 8/2006 |
| FR | 2972395 A1 | 9/2012 |
| GB | 911856 * | 11/1962 |
| GB | 2549935 A * | 11/2017 |
| GB | 2552984 A * | 2/2018 |
| JP | 2001063586 A | 3/2001 |
| WO | WO 03/020572 A1 * | 3/2003 |

OTHER PUBLICATIONS

English Machine Translation of CN103434560A.
English Machine Translation of DE10259684A1.
English Machine Translation of JP2001063586A.
English Machine Translation of EP1686039A1.
English Machine Translation of DE4409046A1.
English Machine Translation of DE2919284A1.
Search and Examination Report dated Jun. 20, 2017 for GB Application No. 1621942.0 filed May 25, 2016.
Search and Examination Report dated Jun. 21, 2017 for GB Application No. 1621941.2 filed May 25, 2016.
English Machine Translation of FR2972395A1 dated Sep. 14, 2012.

* cited by examiner

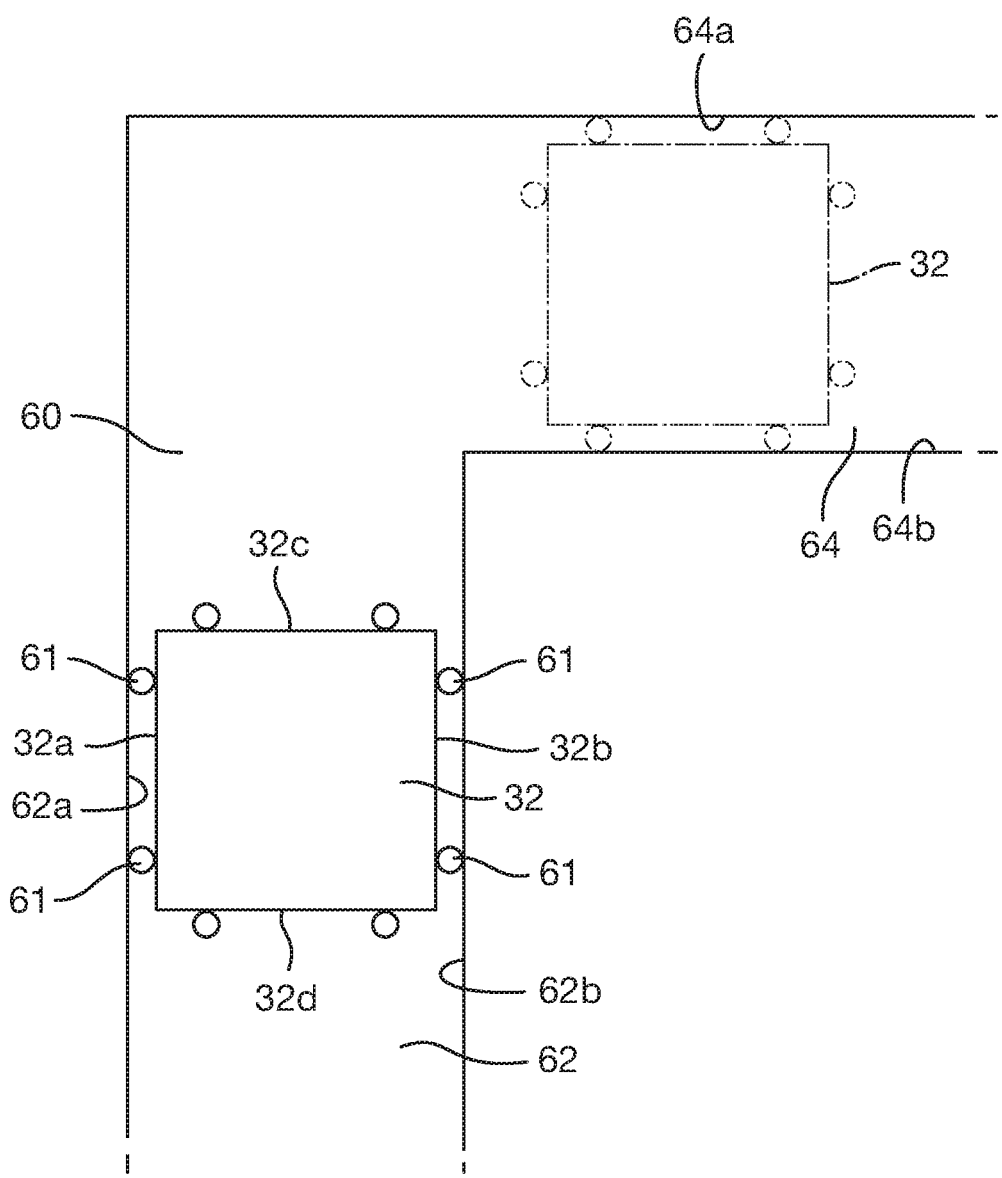

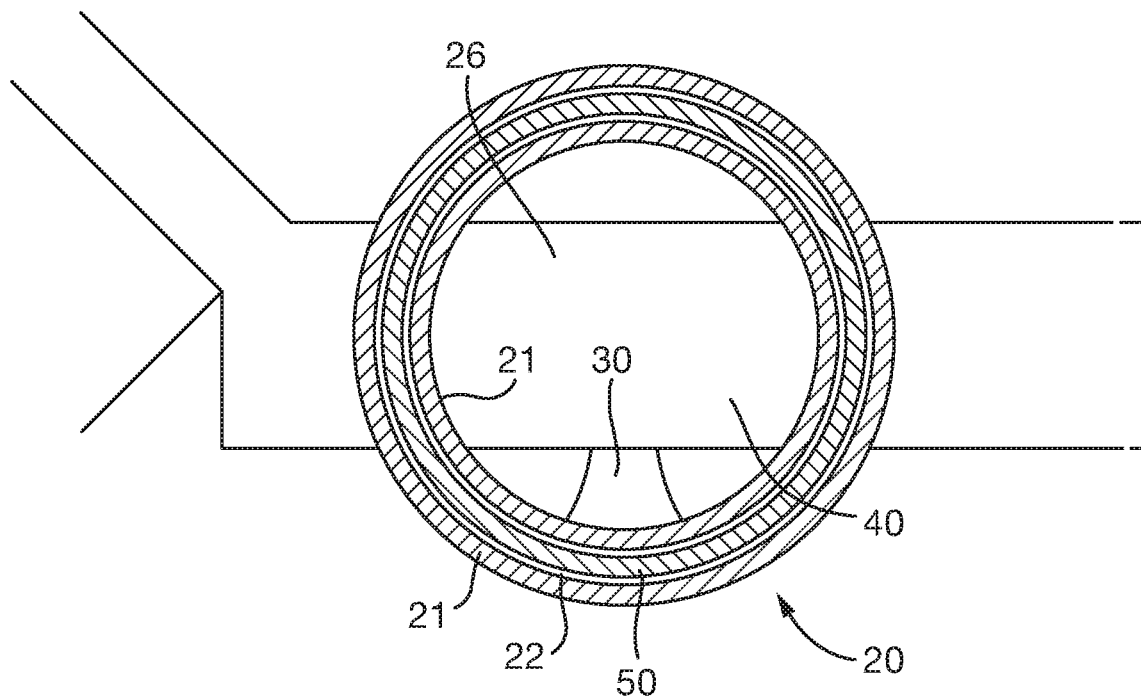

STEERING WHEEL ASSEMBLY

TECHNICAL FIELD

This disclosure relates generally to a steering wheel assembly and particularly, although not exclusively, relates to a steering wheel assembly comprising a steering wheel that translates along a track.

BACKGROUND

Motor vehicle steering wheels are well known and conventionally comprise a hub to which a steering shaft is attached. Such steering wheels may be adjustable, however, the range of movement is limited. It is desirable to provide a steering wheel with a greater range of movement.

SUMMARY

According to an aspect of the present disclosure, there is provided a motor vehicle steering wheel assembly comprising: (a) a steer-by-wire steering wheel, the steering wheel comprising a central axis about which the steering wheel rotates to control the direction of travel of a motor vehicle; (b) a support arm comprising first and second ends, the steering wheel being coupled to the first end of the support arm so as to permit rotation of the steering wheel about the central axis of the steering wheel; and (c) an interior trim portion comprising a track, wherein the second end of the support arm is slidably coupled to the track and the track is configured such that the steering wheel is movable relative to the interior trim portion from a first deployed position in which a first occupant of the vehicle steers the steering wheel to a position away from the first deployed position. The steering wheel is movable relative to the interior trim portion from the first deployed position to a first stowed position in which the steering wheel is stowed in or on the interior trim portion.

The track may comprise a first track portion and the first track portion may extend in a direction with a component in a longitudinal direction of the motor vehicle.

The second end of the arm may slide along the first track portion between the first deployed position and the first stowed position.

At least a portion of the track, e.g. the first track portion, may be curved such that the second end of the support arm follows a curved path defined by the curved track. The curved portion of the track may be curved when viewed in a lateral direction, e.g. in a plane perpendicular to the lateral direction.

The track may at least partially follow an outer surface of the interior trim portion. The track may extend into an inner space of the interior trim portion, e.g. away from the outer surface of the interior trim portion.

The interior trim portion may further comprise a recess in an underside of the interior trim portion. The recess may be configured to receive the steering wheel, e.g. in the stowed position. The steering wheel may be substantially flush with the surrounding interior trim portion when stowed in the recess.

The steering wheel may be rotatable about a further axis at the first or second end of the support arm. The further axis may be orthogonal to the central axis of the steering wheel. For example, the further axis may extend in the lateral direction of the vehicle. Furthermore, the central axis and further axis may or may not intersect.

The steering wheel may be movable relative to the interior trim portion from the first deployed position to a second deployed position in which a second occupant of the vehicle steers the steering wheel. The steering wheel may be movable relative to the interior trim portion from the second deployed position to a second stowed position, e.g. in a manner similar to the movement between the first deployed position and the first stowed position.

The track may comprise a second track portion. The second track portion may extend in a lateral direction of the motor vehicle. The second end of the arm may slide along the second track portion between the first deployed position and the second deployed position. The first and second track portions may be substantially orthogonal, e.g. where they meet.

The support arm may be elongate. The support arm may be curved, e.g. when viewed in the lateral direction. The support arm may project upwards and rearwards from the second end to the first end when the steering wheel is in the first and/or second deployed positions.

The steering wheel assembly may further comprise a selectively releasable lock configured to selectively lock the second end of the support arm relative to the track in the first and/or second deployed positions. The steering wheel assembly may further comprise a controller to control operation of the lock. For example, the steering wheel assembly may be configured such that the lock may be prevented from unlocking unless the vehicle is stationary or the vehicle is in an autonomous mode.

The steering wheel assembly may further comprise electrical contacts provided on each of the track and the second end of the support arm such that at least one of power and data may be transmitted to or from the steering wheel. The electrical contacts may be arranged such that an electrical connection may be made when the steering wheel is in the first deployed position. The steering wheel assembly may comprise further electrical contacts provided in the track such that an electrical connection may be made when the steering wheel is in the second deployed position. The steering wheel assembly may comprise sliding electrical contacts provided between the track and the second end of the support arm such that at least one of power and data can be transmitted to or from the steering wheel as the second end of the support arm slides in the track. Alternatively, separate electrical contacts in the track may be provided for each of the first and second deployed positions.

The steering wheel assembly may further comprise one or more bearings provided between the second end of the support arm and the track. The bearings may comprise roller bearings, ball bearings or any other type of bearing.

The track may comprise a pair of spaced apart channels either side of an aperture through which the support arm may extend. The channels and aperture may extend in the direction of the track. The support arm may comprise a boss at the second end of the support arm. The boss may extend into each of the channels. The support arm may comprise a neck portion between the boss and the remainder of the support arm to pass through the aperture. The boss may be rectangular, e.g. square, in cross-section. A first pair of opposing sides of the rectangular boss may slidably engage side walls of the channels in the first track portion. A second pair of opposing sides of the rectangular boss may slidably engage side walls of the channels in the second track portion. In this way, the boss may permit movement of the steering wheel in different directions.

The steering wheel assembly may be manually operable, e.g. such that the steering wheel may be movable away from the first deployed position by hand. Additionally or alternatively, the steering wheel assembly may comprise an actuator configured to automatically move the steering wheel away from or towards the first and/or second deployed positions.

The steering wheel assembly may further comprise a controller configured to determine a steering angle of vehicle wheels controlled by the steering wheel assembly based on the rotational position of the steering wheel about the central axis.

The first end of the support arm may be coupled to a hub of the steering wheel. Alternatively, the support arm may be coupled to a ring shaped member of the steering wheel such that the steering wheel is hubless.

The ring-shaped member may comprise a slot and an internal recess. The slot and internal recess may extend circumferentially about the ring-shaped member. The slot may be provided in a surface of the ring-shaped member and may form an aperture into the internal recess. The support arm may extend through the slot. A guide portion may be coupled to the support arm. The guide portion may be slidably disposed in the internal recess such that the ring-shaped member is rotatable.

The ring-shaped member may comprise the central axis about which the ring-shaped member may rotate. The slot and internal recess may extend circumferentially about the central axis, e.g. defining a circle. The ring-shaped member may be toroidal. In particular, the ring-shaped member may be a torus, e.g. with a circular cross section in a plane in which the central axis lies.

The steering wheel assembly may be hubless. For example, a void may exist in a centre of the ring-shaped member through which the central axis passes. Accordingly, the central axis may be offset from the support arm. The support arm may be provided at a bottom of the ring-shaped member.

The steering wheel assembly may further comprise one or more sensors configured to determine the rotational position of the ring-shaped member, e.g. relative to the guide portion. The one or more sensors may be configured to determine the position of the ring-shaped member relative to a datum that is fixed or variable between vehicle journeys.

A vehicle, such as a motor vehicle, may comprise the above-mentioned steering wheel assembly.

To avoid unnecessary duplication of effort and repetition of text in the specification, certain features are described in relation to only one or several aspects or embodiments of the steering wheel assembly. However, it is to be understood that, where it is technically possible, features described in relation to any aspect or embodiment of the steering wheel assembly may also be used with any other aspect or embodiment of the steering wheel assembly.

BRIEF DESCRIPTION OF THE DRAWING FIGURES

For a better understanding of the steering wheel assembly, and to show more clearly how it may be carried into effect, reference will now be made, by way of example, to the accompanying drawings, in which:

FIG. 6 is a schematic sectional view of the track for the steering wheel assembly and is orthogonal to the views depicted in FIGS. 5a and 5b; and FIG. 7 is a schematic sectional view of a steering wheel assembly according to an example of the present disclosure.

DETAILED DESCRIPTION

Figure 1:
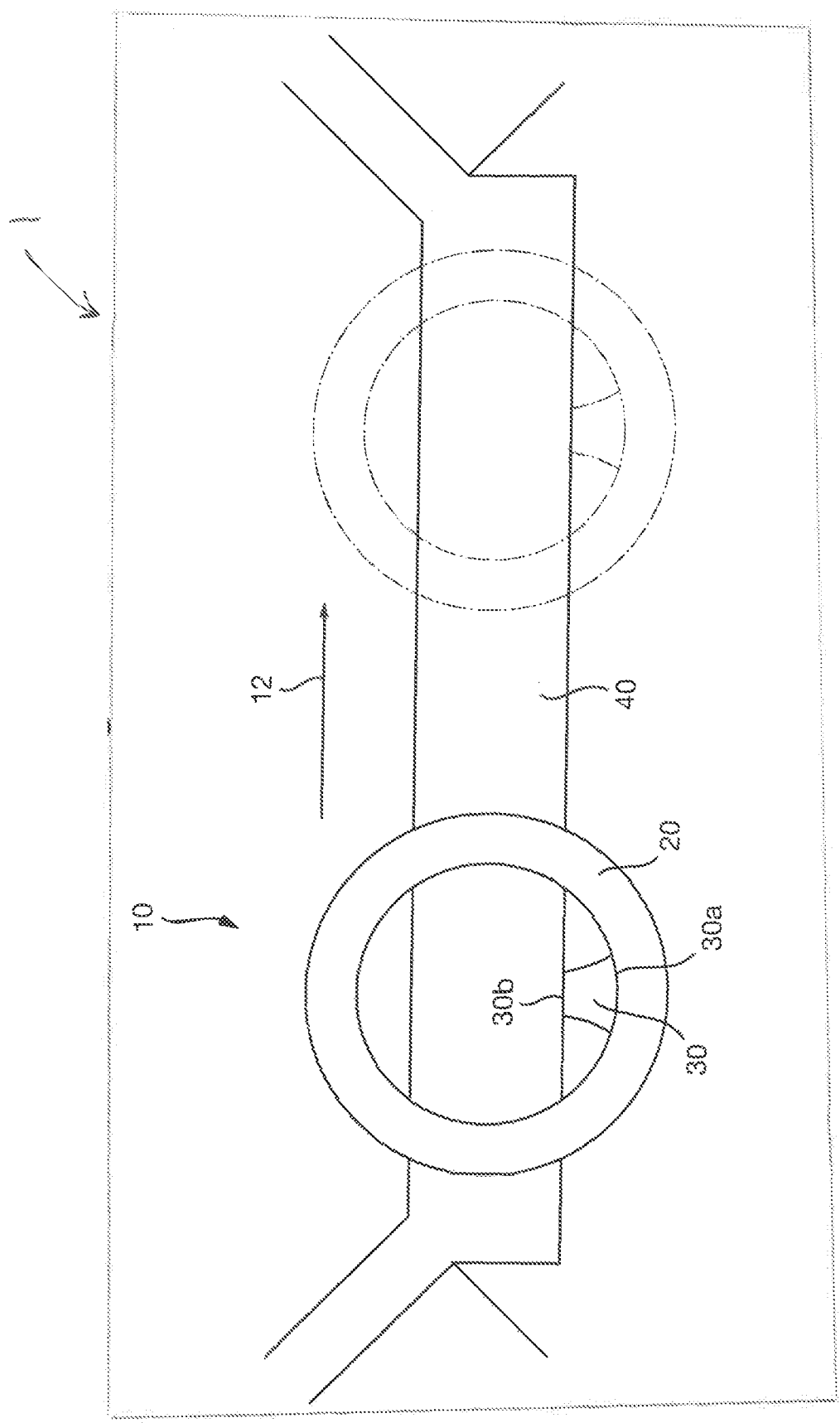
FIG. 1 is a perspective schematic view of a steering wheel assembly according to an example of the present disclosure.

With reference to FIG. 1, a steering wheel assembly 10 for a motor vehicle 1 comprises a steering wheel 20 and a support arm 30. The support arm 30 connects the steering wheel 20 to a support structure of the vehicle. For example, the support structure may comprise a dashboard or associated structure at the front of a vehicle cabin, such as an interior trim portion 40. The steering wheel 20 rotates about a central axis 23 of the steering wheel (see also FIG. 2a) and such rotation of the steering wheel may rotate wheels of the vehicle to control the direction of travel of the vehicle. The steering wheel 20 is a steer-by-wire steering wheel, which may not be mechanically linked to a steering mechanism of the vehicle. In other words, the steering wheel 20 may send an electrical signal to a controller, which in turn sends a signal to an actuator to adjust the directional position of wheels of the vehicle. The steering wheel 20 may be operatively connected to such a controller wirelessly and/or by virtue of one or more wires.

The support arm 30 comprises first and second ends 30a, 30b, wherein the steering wheel 20 may be rotatable about a further axis 24 at the first or second end of the support arm. The first end of the support arm 30a is coupled to the steering wheel 20 and is coupled in such a way so as to permit rotation of the steering wheel about the central axis of the steering wheel. The coupling between the support arm 30 and the steering wheel 20 is spaced apart from the interior trim portion 40. This coupling will be described in more detail below with reference to FIG. 7.

The second end of the support arm 30b is coupled to the interior trim portion 40. The second end of the support arm 30b is slidable in a track provided in the interior trim portion 40 such that the steering wheel 20 is movable from a first deployed position in which a first occupant of the vehicle may steer the steering wheel to a position away from the first position. As depicted in FIG. 1, the steering wheel 20 may be movable relative to the interior trim portion 40 from the first deployed position to a second deployed position in which a second occupant of the vehicle may steer the steering wheel. In other words, the steering wheel 20 may move in a lateral direction 12 of the vehicle from one end of the interior trim portion 40 to another end of the interior trim portion. Control of the vehicle may thus be passed from a first occupant to a second occupant of the vehicle. Other systems of the vehicle may adapt for the other occupant to control the vehicle. For example, pedals may extend from the floor of the footwell and mirrors may be adjusted so that the new driver has the appropriate views.

Figure 2A:
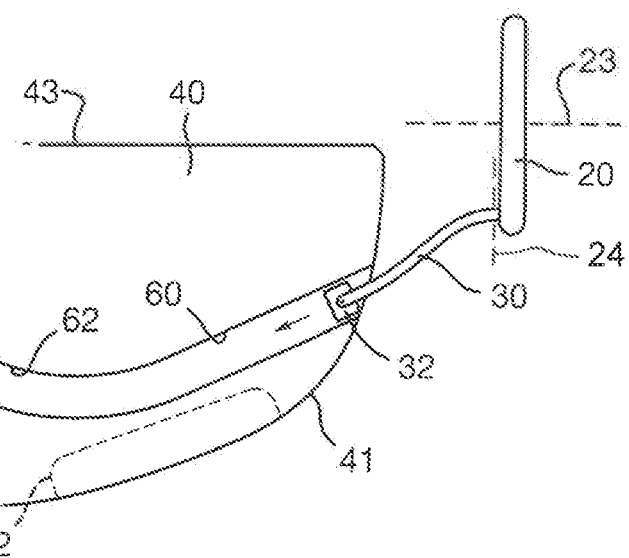
FIGS. 2a, 2b and 2c are schematic sectional side views of a steering wheel assembly according to an example of the present disclosure.
Figure 2B:
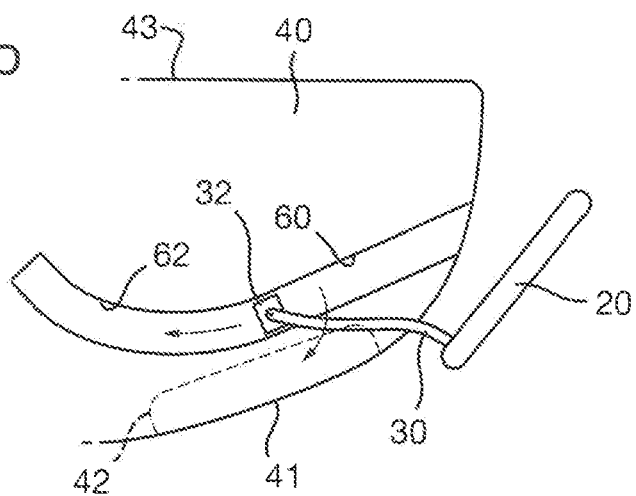
Figure 2C:
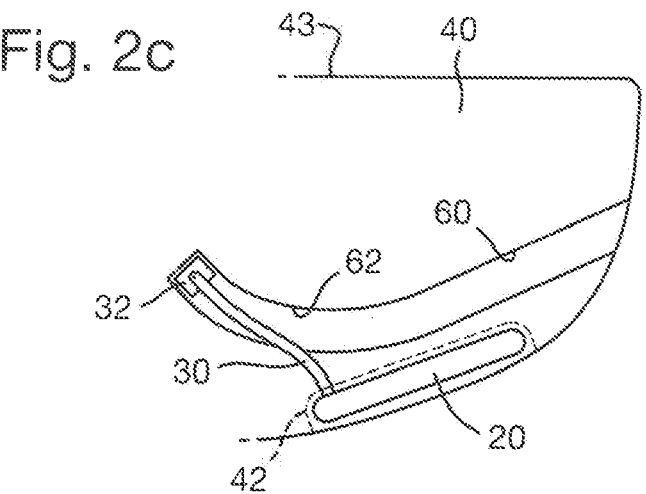

With reference to FIGS. 2a, 2b and 2c, the steering wheel 20 is movable relative to the interior trim portion 40 from the first deployed position to a first stowed position in which the steering wheel 20 is stowed in or on the interior trim portion 40. As shown in FIGS. 2a, 2b and 2c, the second end of the support arm 30b may slide in a track 60 in the interior trim portion 40. In particular, the second end of the support arm 30b slides in a first track portion 62 of the track. The first track portion 62 extends in a direction with a component in a longitudinal direction of the vehicle. The second end of the support arm 30b may slide along the first track portion 62 between the first deployed position (as depicted in FIG. 2a) to an intermediate position (as depicted in FIG. 2b) and finally to the stowed position (as depicted in FIG. 2c).

A boss 32 may be provided at the second end of the support arm 30b. The boss 32 may slide in the track 60. The support arm 30 may also pivot with respect to the boss 32 by virtue of a pivotable connection between the boss 32 and support arm 30. Alternatively, the support arm 30 and boss 32 may be rigidly connected together. In a further alternative arrangement, the steering wheel 20 may be pivotably coupled to the first end of the support arm 30a.

As shown in FIGS. 2a, 2b and 2c, the first track portion 62 may be curved. As the steering wheel 20 is moved from the first deployed position to the stowed position, the boss 32 may first move in a downwards direction in addition to moving in a forward direction relative to the vehicle. The boss 32 may subsequently move in an upwards direction, in addition to the forward direction to allow the steering wheel 20 to be stowed in an underside 41 of the interior trim portion 40. In particular, the interior trim portion 40 may comprise a recess 42 in the underside 41 for receiving the steering wheel 20 when in the stowed position (as depicted in FIG. 2c). It will be appreciated that the track 60 may be spaced apart from the recess 42. However, there may be a slit that extends along the length of the track 60 and passes from the underside 41 of the interior trim portion to the track 60. The support arm 30 may extend through the slit.

As is shown in FIGS. 2a, 2b and 2c, the support arm 30 may connect to the steering wheel 20 at a point that is spaced apart from the centre of the steering wheel. For example, the support arm 30 may connect to the steering wheel 20 at the bottom of the steering wheel 20. The support arm 30 may extend away from the steering wheel 20 in a direction with a component parallel to the central axis 23 of the steering wheel 20. The support arm 30 may also extend away from the steering wheel 20 in a direction with a radial component. In other words, the support arm 30 may extend axially and radially away from the central axis 23. The support arm 30 may be substantially straight or as shown, the support arm 30 may be curved, e.g., with a point of inflection between the first and second ends 30a, 30b. The support arm 30 may be elongate, e.g., with a width that fits through the above-mentioned slit that leads to the track 60.

FIG. 2a shows the steering wheel 20 in the first deployed position. When it is desirable to move the steering wheel 20 into the stowed position, the boss 32 may slide in the first track portion 62. At the same time or subsequently, the steering wheel 20 may rotate about the pivotable connection between the steering wheel 20 and the boss 32. The combined translation of the boss and rotation of the steering wheel 20 may allow the steering wheel 20 to pass between the knees of the occupant and the interior trim portion 40. The steering wheel 20 may thus closely follow the contour of the underside 41 of the interior trim portion 40, for example as depicted in FIG. 2b. Continued translation of the boss 32 in the first track portion 62 allows the steering wheel to reach the stowed position in which the steering wheel 20 may reside in the recess 42, as depicted in FIG. 2c.

The steering wheel 20 may be substantially flush with the surrounding interior trim portion 40 when stowed in the recess 42. A movable cover may extend across the recess 42 to conceal the recess 42 or the recess 42 may be positioned so as not to be visible to the occupants of the vehicle when seated in the vehicle.

A top 43 of the interior trim portion 40 may be substantially flat, e.g., horizontal, so that when the steering wheel 20 is stowed, a table-top surface is available to the occupants of the vehicle without the steering wheel being in the way.

The track 60 may extend into an inner space of the interior trim portion 40, e.g., away from the underside 41 of the interior trim portion. Alternatively, in an arrangement not shown, the track may follow the contours of the underside 41 of the interior trim portion 40.

Figure 3:
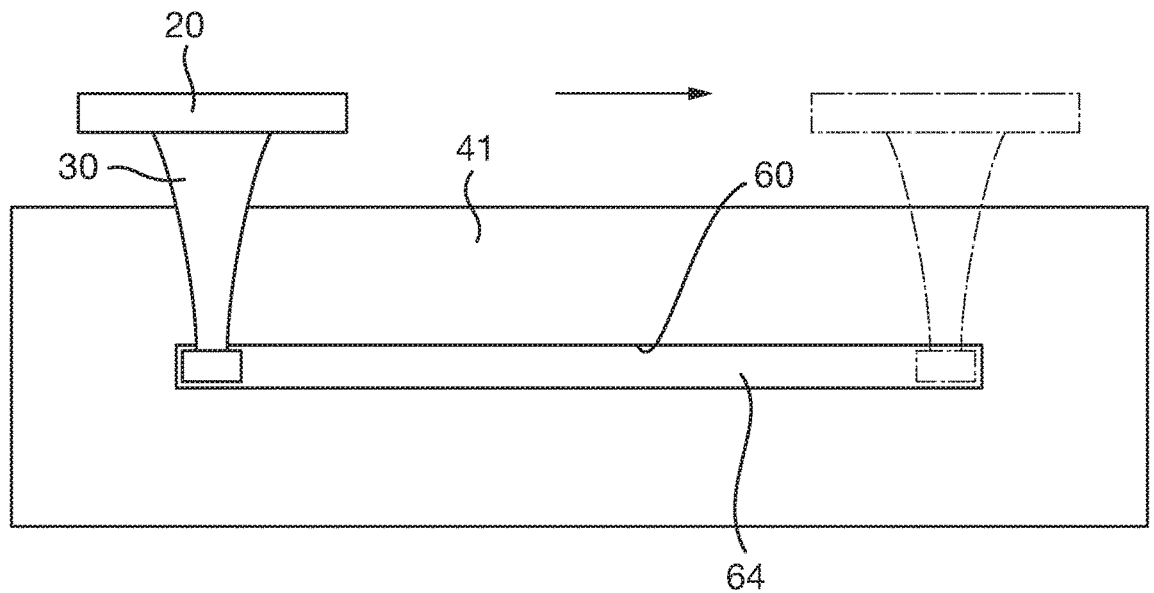
FIG. 3 is a bottom schematic view of a steering wheel assembly according to an example of the present disclosure.
Figure 4:
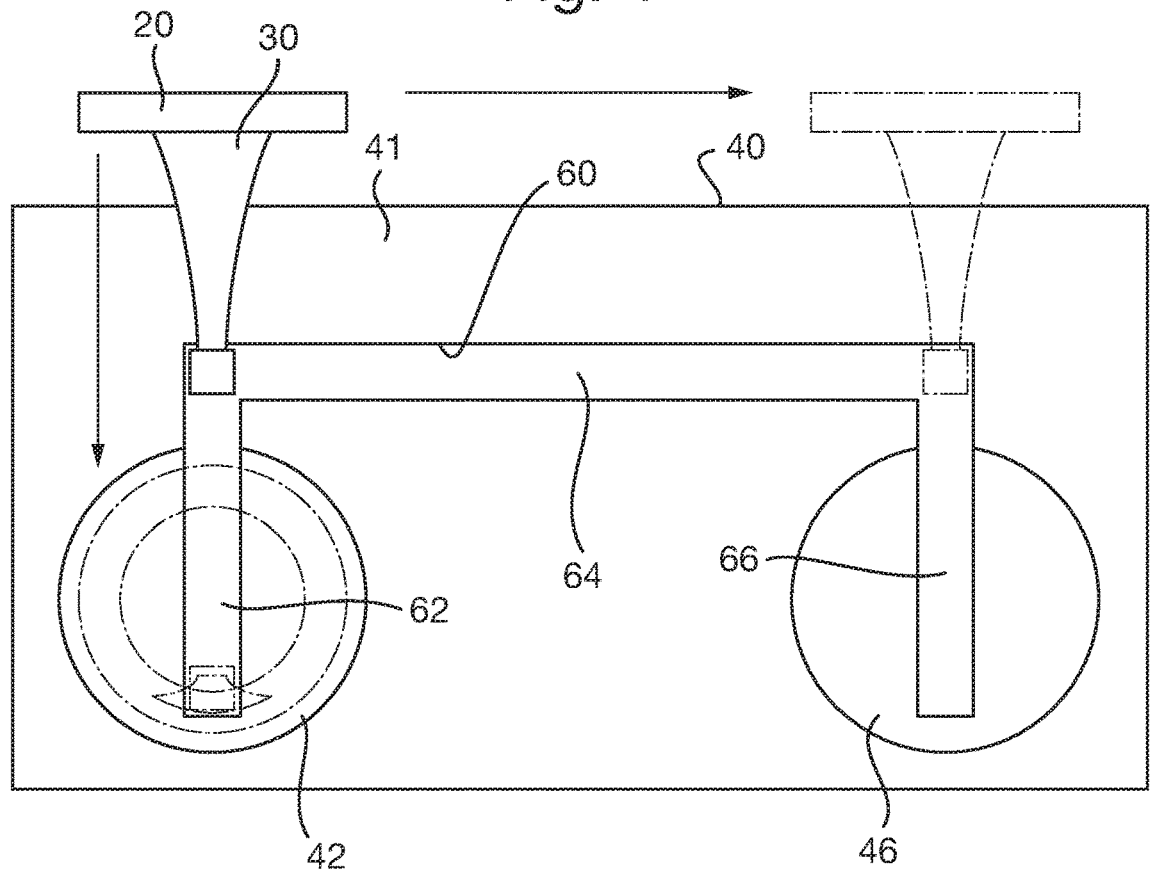
FIG. 4 is a bottom schematic view of a steering wheel assembly according to an example of the present disclosure.

Referring now to FIG. 3, the steering wheel 20 may be movable relative to the interior trim portion 40 from the first deployed position to the second deployed position in which a second occupant of the vehicle may steer the steering wheel. The track 60 may comprise a second track portion 64, which may extend in a lateral direction of the vehicle. The second end of the support arm 30b may slide along the second track portion 64 between the first and second deployed positions. The second track portion 64 may be provided additionally or alternatively to the first track portion 62. For example, with reference to FIG. 4, the track 60 may comprise both first and second track portions 62, 64. The track 60 may further comprise a third track portion 66 provided at the opposite end of the track to the first track portion 62. The third track portion 66 may be equivalent to the first track portion 62 and may enable the steering wheel 20 to move from the second deployed position to a second stowed position in a manner similar to the movement between the first deployed position and the first stowed position. In an alternative arrangement, the third track portion 66 may be omitted and the steering wheel may move from the second deployed position to the first deployed position prior to being stowed in the first stowed position. The first track portion 62 (and third track portion 66 if present) may be orthogonal to the second track portion 64 where they meet. In the case of both first and third track portions 62, 66 being provided, the interior trim portion 40 may also comprise a recess 46 for receiving the steering wheel 20 in the second stowed position. Other features described in respect of the first track portion 62 and the first stowed position may apply equally to the third track portion 66 and the second stowed position.

Figure 5A:
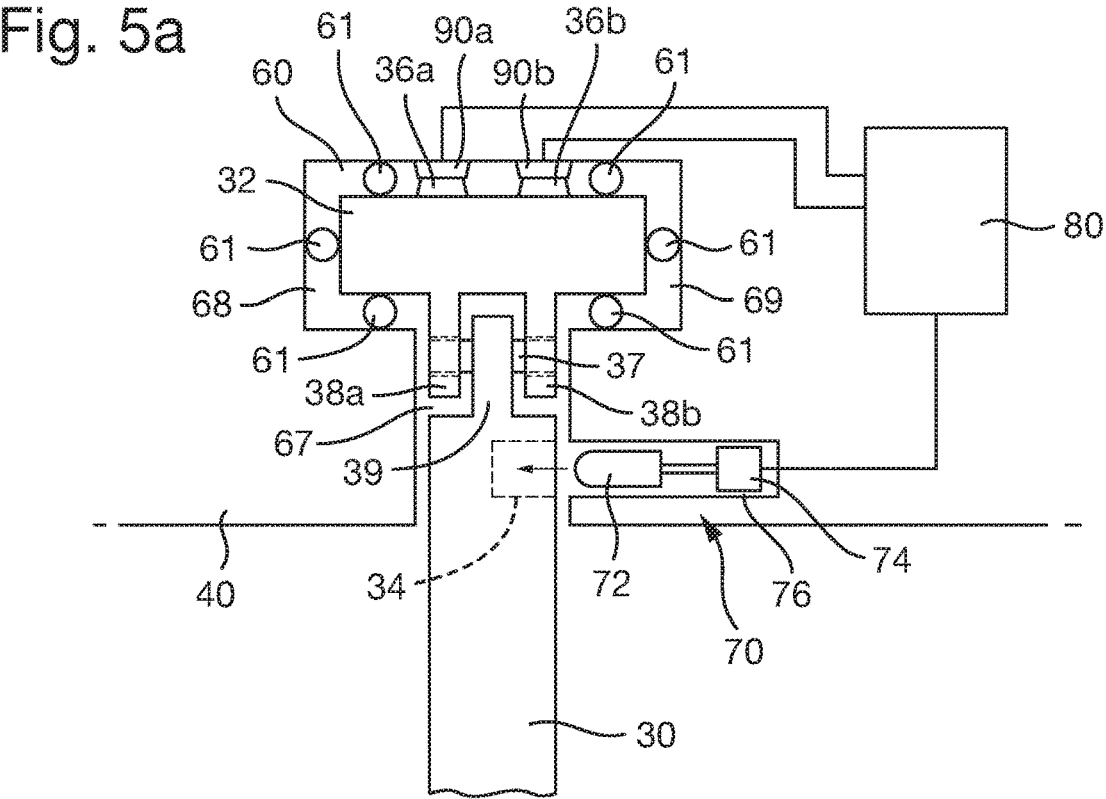
FIGS. 5a and 5b are schematic sectional side views of a track for a steering wheel assembly according to an example of the present disclosure.
Figure 5B:
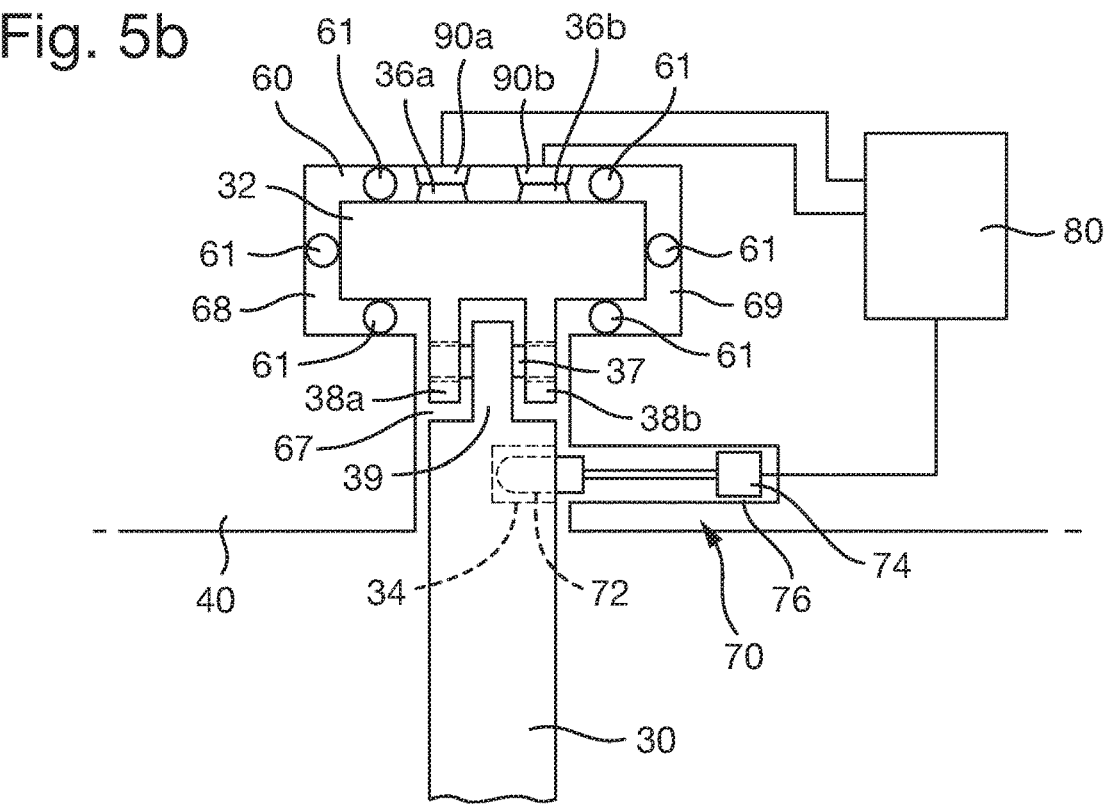

Referring now to FIGS. 5a and 5b, further details of the track 60 will be described. FIGS. 5a and 5b show cross-sectional views of the track 60, which may apply to any of the first, second and third track portions 62, 64, 66. As is depicted, the track 60 comprises a pair of spaced apart channels 68, 69, which oppose one another. The channels 68, 69 are provided either side of the slit 67. The slit 67 extends in the direction of the track 60. The boss 32 resides in the channels 68, 69. The boss 32 may be wider than the slit 67 so that shoulders formed by the channels 68, 69 prevent the boss from leaving the track 60. Accordingly, the support arm 30 and/or boss 32 may comprise a neck portion which passes through the slit 67. The depth of the slit 67 may vary along the length of the track 60. Such variation allows the arrangement depicted in FIGS. 2a-2c in which the track 60 moves away from the underside 41 of the interior trim portion.

The steering wheel assembly 10 may further comprise one or more bearings 61 provided between the boss 32 and the track 60. The bearings 61 may be provided on the boss 32, e.g., on one or more of the surfaces of the boss. The bearings 61 may comprise roller bearings, ball bearings or any other type of bearing that may reduce friction between the boss 32 and the track 60. The support arm 30 and boss 32 may thus slide freely in the track 60.

Referring now to FIG. 6 which shows a further sectional view of the boss 32 and track 60, which is orthogonal to the views depicted in FIGS. 5a and 5b, the boss 32 may be rectangular in cross-section. Having a rectangular cross-section may allow the boss 32 to slide in the first track portion 62 and in the second track portion 64, which may be orthogonal to the first track portion 62 where they meet. For example, a first pair of opposing sides 32a, 32b of the boss 32 may slidably engage side walls 62a, 62b of the first track portion 62. By contrast, a second pair of opposing sides 32c, 32d of the boss 32 may slidably engage side walls 64a, 64b of the second track portion 64 when the boss is in the second track portion. Accordingly, the distance between opposing sides 32a, 32b may correspond to the width of the first track portion 62 (accounting for the presence of any bearings 61) and the distance between opposing sides 32c, 32d may correspond to the width of the second track portion 64 (again accounting for any bearings 61). In a particular example, the boss 32 may be square in cross-section, e.g., in the case of the width of the first and second track portions 62, 64 being the same.

Returning now to FIGS. 5a and 5b, the steering wheel assembly 10 may further comprise a selectively releasable lock 70. The lock 70 may selectively lock the second end of the support arm 30b relative to the track 60. The lock 70 may be provided at each of the first and second deployed positions so that the steering wheel 20 can be locked in either position during use. The lock 70 may comprise a lug 72 which is coupled to an actuator 74. The actuator 74 may selectively extend or retract the lug 72 from a recess 76 in the interior trim portion 40. The lug 72 may extend into a corresponding recess 34 in the second end 30b of the support arm 30. When the lug 72 is in the recess 34 the support arm 30 may be prevented from moving. FIG. 5a shows the lug 72 in a retracted position, whereas FIG. 5b shows the lug in an extended position in the recess 34.

Although FIGS. 5a and 5b show the recess 34 being in the form of a blind bore, it will be appreciated that the recess 34 may extend all the way through the second end of the support arm 30. In which case, the lug 72 may extend through the recess 34 and into a further recess in the interior trim portion 40 on a side opposite to that of the actuator 74. FIGS. 5a and 5b also show the lock being provided in the slit 67, however it will be appreciated that the lock may be provided in other positions and may for example lock against the boss 32. Furthermore, additional locks may be provided at each lockable position, e.g., to prevent movement of the boss in either direction. Instead of extending into recess 34, the lug 72 of the lock may extend adjacent to the support arm, e.g. above, below and/or to one side of the support arm.

The lock 70 may be operatively coupled to a controller 80, which may control operation of the lock. For example, the controller 80 may prevent the lock 70 from being unlocked unless the vehicle is stationary or the vehicle is in an autonomous mode, which would allow the occupant of the vehicle to not control the steering wheel 20. The lock may be electronically manually activated. However, manual operation of the lock 70 may be prevented by the controller 80, for example if it is determined that the vehicle is in operation and it is undesirable for the steering wheel to move. The controller 80 may however permit the steering wheel 20 to move from one lateral position to the other if the vehicle is capable of taking over operation of the vehicle during the transition of the steering wheel.

The steering wheel assembly 10 may further comprise electrical contacts 90a, 90b provided on the track 60 and electrical contacts 36a, 36b provided on the boss 32. The electrical contacts 36a, 90a are configured to contact respective electrical contacts 36b, 90b so that power and/or data may be transferred to or from the steering wheel assembly 10. The electrical contacts 90a, 90b in the track 60 may be provided at the first deployed position. Further electrical contacts may be provided at the second deployed position. The electrical contacts 36a, 36b in the boss 32 may thus engage the electrical contacts at the first and/or second deployed positions. Alternatively, the electrical contacts 90a, 90b in the track 60 may extend from the first deployed position to the second deployed position so that the electrical contacts 36a, 36b in the boss 32 remain in contact with the electrical contacts 90a, 90b respectively whilst the boss is moving in the track. In other words, the electrical contacts 90a, 90b may form sliding electrical contacts. In either case, the electrical contacts 90a, 90b may be operatively coupled to the controller 80 or any other controller of the motor vehicle. Such a controller may send or receive data to or from the steering wheel assembly 10. For example, sensors of the steering wheel assembly 10 may determine the rotational position of the steering wheel 20 and a controller may adjust the position of wheels of the vehicle according to the rotational position of the steering wheel. Data from position sensors in the steering wheel assembly 10 may be sent via the electrical contacts 36a, 36b and electrical contacts 90a, 90b. Power may also be provided to the steering wheel assembly via the same or different electrical contacts. Although not depicted, it will be appreciated that internal wiring may be provided in the support arm 30 to transfer signals and/or power from the electrical contacts to the steering wheel 20.

In an alternative arrangement (not depicted), the lock may provide the electrical connection between the controller 80 and the steering wheel assembly 10. For example, when the lug 72 is extended into the recess 34, an electrical connection may be made between the lug 72 and a portion of the support arm 30 or boss 32.

An electrical connection between the boss 32 and the controller 80 may alternatively be established by virtue of one or more wires, e.g., which have a length sufficient to follow the boss 32 as it moves in the track 60. Such wires may travel up and down the track 60, e.g., uncoil or unwrap, as the boss 32 slides in the track. In a further alternative arrangement, power and/or control signals may be provided by wireless means, such as electrical induction by cable turns in the interior trim portion 40 and boss 32.

Referring still to FIGS. 5a and 5b, the boss 32 may comprise a pair of protrusions 38a, 38b, which are rotatably coupled to a corresponding protrusion 39 at the second end 30b of the support arm 30. A pin 37 may pass through bores in the protrusions 38a, 38b, 39 so that the support arm 30 may rotate relative to the boss 32. A pivotable connection may additionally or alternatively be provided at the first end 30a of the support arm 30. In a further alternative arrangement (again not depicted), the support arm 30 may be rigidly connected to the boss 32 and a guide portion 50 of the steering wheel 20, which will be described in more detail below.

The steering wheel assembly 10 may be manually operable such that the steering wheel 20 may be moved away from the first deployed position by hand. Additionally or alternatively, the steering wheel assembly 10 may comprise an actuator (not shown), such as a linear actuator, which may move the steering wheel assembly 10 in the track 60. Movement of the steering wheel assembly 10 by such an actuator may be controlled by the controller 80 or any other controller.

As depicted in FIG. 7, the steering wheel 20 comprises a ring-shaped member 21 and a guide portion 50, which is slidably disposed in an internal recess 22 of the ring-shaped member 21. The internal recess 22 extends circumferentially about the central axis so as to define a circle. The guide portion 50 may extend about the entire circumference of the internal recess 22, such that the guide portion 50 defines a circle. The guide portion 50 is coupled to the support arm 30 and thus to the support structure 40. (The support arm and guide portion may be integral or they may be separate components attached together during assembly.) Accordingly, the guide portion 50 is rigidly connected to the support structure 40. By contrast, the ring-shaped member 21 may rotate about the guide portion 50 and about the central axis 23 at the centre of the ring-shaped member 21.

The ring-shaped member 21 may also be circular and as such may be toroidal. The ring-shaped member 21 may be circular in cross-section, although the cross-sectional shape may vary about the circumference of the ring-shaped member.

Referring still to FIG. 7, it will be appreciated that a void 26 may exist at the centre of the ring-shaped member 21. Accordingly, the steering wheel assembly 10 may be hubless. However, in an alternative arrangement, the steering wheel may comprise a central hub to which the support arm 30 may connect.

The steering wheel assembly 10 may further comprise one or more sensors (not shown) configured to determine the rotational position of the ring-shaped member 21, e.g., relative to the guide portion 50. The one or more sensors may be configured to determine the position of the ring-shaped member relative to a datum that may be fixed or variable between vehicle journeys.

It will be appreciated by those skilled in the art that although the steering wheel assembly has been described by way of example, with reference to one or more examples, it is not limited to the disclosed examples and alternative examples may be constructed without departing from the scope of the steering wheel assembly as defined by the appended claims.

What is claimed:

1. A steering wheel assembly comprising:
   a steer-by-wire steering wheel including a central axis about which the steer-by-wire steering wheel rotates to control direction of travel of a motor vehicle;
   a support arm comprising a first end, a second end and a boss at the second end, the steer-by-wire steering wheel being coupled to the first end of the support arm so as to permit rotation of the steer-by-wire steering wheel about the central axis; and
   an interior trim portion comprising a track, wherein the track comprises a pair of spaced apart channels either side of an aperture through which the support arm extends, and wherein the boss extends into each of the pair of spaced apart channels,
   wherein the second end of the support arm is slidably coupled to the track and the track is configured such that the steer-by-wire steering wheel is movable relative to the interior trim portion from a first deployed position in which a first occupant of the motor vehicle steers the steer-by-wire steering wheel to a position away from the first deployed position, and,
   wherein the steer-by-wire steering wheel is movable relative to the interior trim portion from the first deployed position to a stowed position in which the steering wheel is stowed in or on the interior trim portion.

2. The steering wheel assembly of claim 1, wherein the track comprises a first track portion and the first track portion extends in a longitudinal direction of the motor vehicle.

3. The steering wheel assembly of claim 2, wherein at least a portion of the track is curved such that the second end of the support arm follows a curved path.

4. The steering wheel assembly of claim 3, wherein the at least said portion of the track is curved when viewed in a lateral direction.

5. The steering wheel assembly of claim 4, wherein the track at least partially follows an outer surface of the interior trim portion.

6. The steering wheel assembly of claim 5, wherein the track extends into an inner space of the interior trim portion.

7. The steering wheel assembly of claim 6, wherein the interior trim portion further comprises a recess in an underside of the interior trim portion, the recess being configured to receive the steer-by-wire steering wheel.

8. The steering wheel assembly of claim 7, wherein the steer-by-wire steering wheel is rotatable about a further axis at the first or second end of the support arm, the further axis being orthogonal to the central axis of the steer-by-wire steering wheel.

9. The steering wheel assembly of claim 8, wherein the steering wheel is movable relative to the interior trim portion from the first deployed position to a second deployed position in which a second occupant of the motor vehicle steers the steer-by-wire steering wheel.

10. The steering wheel assembly of claim 9, wherein the track comprises a second track portion and the second track portion extends in said lateral direction of the motor vehicle.

11. The steering wheel assembly of claim 1, wherein the support arm is elongate.

12. The steering wheel assembly of claim 11, wherein the support arm is curved.

13. The steering wheel assembly of claim 12, wherein the support arm projects upwards and rearwards from the second end to the first end of the support arm in the first deployed position.

14. The steering wheel assembly of claim 1, wherein the steering wheel assembly further comprises a selectively releasable lock configured to selectively lock the second end of the support arm relative to the track in the first deployed position.

15. The steering wheel assembly of claim 14, wherein the steering wheel assembly is configured such that the selectively releasable lock is prevented from unlocking unless the motor vehicle is stationary or the vehicle is in an autonomous mode.

16. The steering wheel assembly of claim 1, wherein the steering wheel assembly further comprises electrical contacts provided in the track and the second end of the support arm such that at least one of power and data is transmitted to or from the steer-by-wire steering wheel when in the first deployed position.

17. The steering wheel assembly of claim 16, wherein the steering wheel assembly further comprises sliding electrical contacts provided between the track and the second end of the support arm such that at least one of power and data is transmitted to or from the steer-by-wire steering wheel as the second end of the support arm slides in the track.

18. The steering wheel assembly of claim 1, wherein the steering wheel assembly further comprises one or more bearings provided between the second end of the support arm and the track.

\* \* \* \* \*